UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 320,402, dated June 16, 1885.

Application filed May 18, 1885. (No specimens.)

*To all whom it may concern:*

Be it known that I, JOHN C. SCHUMAN, of Akron, in the county of Erie and State of New York, have invented a new and useful Improvement in the Manufacture of Starch, of which the following is a specification.

This invention relates to an improved method of manufacturing commercial starch—such as laundry and culinary starch—from Indian corn or maize, and has for its object to obtain the starch in a simple, expeditious, and inexpensive manner by extracting a crude starch comparatively free from impurities from the corn, and then refining such crude starch to the desired degree of purity.

In practicing my invention, the corn is first steeped in a suitable vat or tank, which is provided with a perforated false bottom for draining, at a temperature of about 140° Fahrenheit, for about fifteen hours, and this temperature is maintained in the steep tank by renewing the water from time to time from a tank containing hot water. The temperature is preferably not allowed to rise to 155° Fahrenheit, as it would cause the starch-cells to burst, and render the subsequent recovery of the starch difficult if not impossible. When the steeping is completed, the kernels of corn have become expanded, swelled, and softened by the combined action of the heat and moisture, and the hulls and germs tend to separate from the starchy portions of the kernels, so that these component parts of the kernels are only loosely held together and in a condition in which they can be partially detached from each other by the following process: The warm water is now drawn from the steep, and cold water is introduced into the same, whereby the corn is cooled or chilled. This not only presents the corn to the subsequent operation of reduction in a cold state, but also tends to toughen the hulls and germs and renders them less liable to become finely pulverized in reducing the kernels. The water is next drained thoroughly from the corn in the steep-vat, a period of from four to six hours being usually allowed for this purpose. The steeped corn, after having been thoroughly drained, is next reduced in a suitable mill, which is preferably a disk-mill, in which one disk has a slight eccentric movement with reference to the other, and which is known as the "Bogardus Mill." Or, if preferred, a roller-mill or other reduction-machine, whereby the corn is coarsely ground or crushed, may be employed for this purpose. By this machine the corn is coarsely ground or reduced, whereby the hulls and germs are to a large extent detached from the starchy portions of the kernels in comparatively large fragments, while the starchy portions are more finely reduced, so that a large proportion of the starch can be separated from the fragments of hulls and broken germs. This is accomplished by a suitable vibrating or rolling screen, which is so clothed that the starch passes through the meshes of the screen, while the hulls and broken germs tail off together; or, if desired, the reduced material may be divided by the screen into a number of different products of different degrees of fineness, the finest product being crude starch, while the coarser products consist of fragments of hulls and broken germs containing a greater or less admixture of starch. The tailings or coarse products of the separation are preferably reduced again to detach from the fragments of hulls and broken germs the starch particles which may adhere to the same, and this detached starch is recovered by a second sifting operation and added to the starch of the first separation. The starch-meal so obtained from the corn is next ground with water in a suitable grinding-mill, and the starch milk or liquid escaping from the mill is delivered upon a shaking separating-sieve, which effects a separation of the starch from the remaining fibrous matter and offal, the starch being washed through the meshes of the sieve by water sprays, while the fibrous matter and offal tail off. If desired, the starch-liquid may be stirred or agitated in a suitable mixing-tank before it is delivered upon the separating-sieve. The starch-liquid is collected in a trough or gutter under the sieve and discharged therefrom into one or more receiving vats, in which the starch is permitted to settle; or, if preferred, the starch may be deposited out of the water on starch-runs or inclined tables in a well-known manner. When the starch has been deposited in said vats, the water is drawn off from above the starch. Fresh water is then mixed with the starch deposited in said vats or on said tables in such quantity that the mixture can be thoroughly agitated. A solution of caustic alkali is next introduced into this starch-liquid in the proportion of about one-eighth of a pound of alkali to the product from each bushel of grain, the alkaline solution weighing about $2\frac{1}{2}°$ Baumé. This alkaline solution is thoroughly mixed with the starch-liquid by the agitators with which the mixing-vats are provided and water is added until the gravity of the mixture is reduced to about $3°$ Baumé. The starch is next deposited out of this liquid by running the latter over starch-runs or inclined tables in a well-known manner, or by settling the starch in vats and drawing off the water from above the deposited starch. The deposited starch is next broken up and again mixed with water in a suitable vat and then permitted to settle, and the water is drawn off from above the starch, whereby any remaining traces of alkali and other impurities are removed from the starch. This operation of settling and washing may be repeated as often as may be necessary to produce starch of the desired degree of purity. The refined starch is then placed in molds and dried in a suitable kiln, unless it is desired to make green starch, when the operation of drying is omitted. The crude starch is in this manner extracted from the corn in a simple manner without requiring such large quantities of water as are used in the ordinary wet process now generally practiced. The bulk of the material, which is treated with alkali and refined, is greatly reduced, thereby reducing the cost of the plant and the working expense correspondingly, and the offal is recovered in a slightly moist condition, uncontaminated by chemicals, so that it can be used advantageously as cattle-feed.

I claim as my invention—

1. The herein-described process of manufacturing refined starch from Indian corn, which consists in steeping the corn, then draining the corn, then coarsely grinding or crushing the corn, then separating the crude starch from the coarse offal by sifting, and then refining the separated crude starch, substantially as set forth.

2. The herein-described process of manufacturing refined starch from Indian corn, which consists in steeping the corn, then draining the corn, then coarsely grinding or crushing the corn, then separating the crude starch from the coarse offal by sifting, then grinding the separated crude starch with water, and then refining the ground starch, substantially as set forth.

3. The herein-described process of manufacturing refined starch from Indian corn, which consists in steeping the corn, then draining the corn, then coarsely grinding or crushing the corn, then separating the crude starch from the coarse offal by sifting, then grinding the separated crude starch with water, then separating the remaining fibrous matter and offal from the starch by sifting with water, then treating the separated starch with caustic alkali, and then depositing the starch, substantially as set forth.

Witness my hand this 15th day of May, 1885.

JOHN C. SCHUMAN.

Witnesses:
WM. H. CARR,
W. ELMORE.